(No Model.) 2 Sheets—Sheet 2.

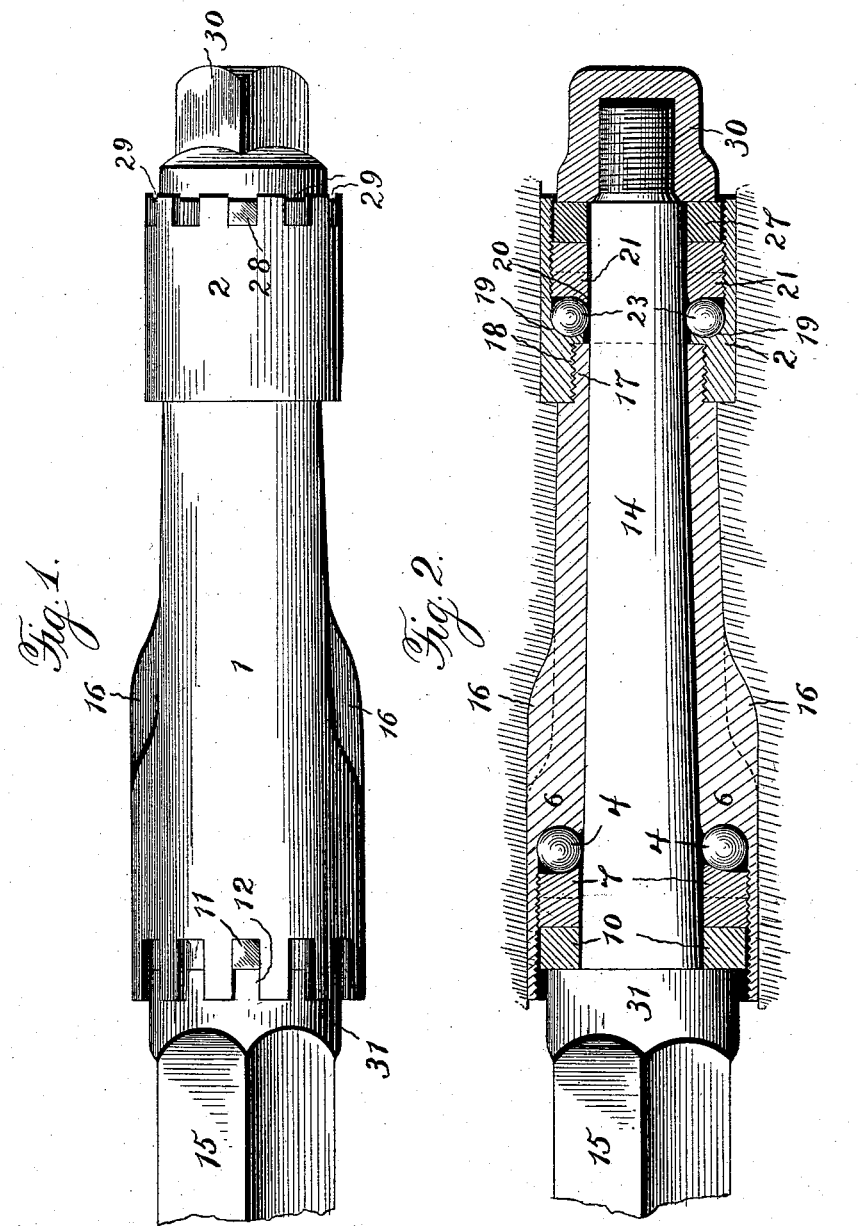

W. S. ROBINSON.
BALL BEARING FOR WHEEL BOXES.

No. 531,564. Patented Dec. 25, 1894.

Witnesses:
Jas. E. Hutchinson.
Robert Everett.

Inventor,
William S. Robinson.
By James L. Norris
Attorney.

THE NORRIS PETERS CO., PHOTO-LITHO., WASHINGTON, D. C.

UNITED STATES PATENT OFFICE.

WILLIAM S. ROBINSON, OF FANCY FARM, KENTUCKY, ASSIGNOR OF TWO-THIRDS TO THOMAS J. ROBB AND CHARLES A. HAESELEY, OF SAME PLACE.

BALL-BEARING FOR WHEEL-BOXES.

SPECIFICATION forming part of Letters Patent No. 531,564, dated December 25, 1894.

Application filed September 8, 1894. Serial No. 522,482. (No model.)

*To all whom it may concern:*

Be it known that I, WILLIAM S. ROBINSON, a citizen of the United States, residing at Fancy Farm, in the county of Graves and State of Kentucky, have invented new and useful Improvements in Ball-Bearings for Wheel-Boxes, of which the following is a specification.

This invention relates to ball-bearing wheel-hub boxes, and has for its objects to improve and simplify the application of anti-friction balls to the wheels of vehicles; prevent them from falling out of place when the wheel is removed from the axle-spindle; provide a boxing suitable for wheels and axle-spindles now in use and which can be easily fitted to differently sized hubs; and to so construct the boxing as to permit the ready renewal of worn or disabled parts whenever necessary.

To these ends and for other purposes that will presently appear my invention consists in the features of construction and novel combinations of devices in ball-bearings for vehicle wheels, as hereinafter more particularly described and claimed.

Figure 3:
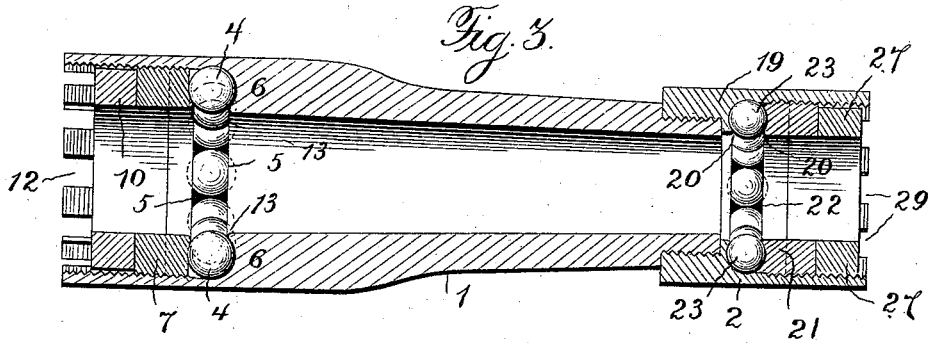
Figure 4:
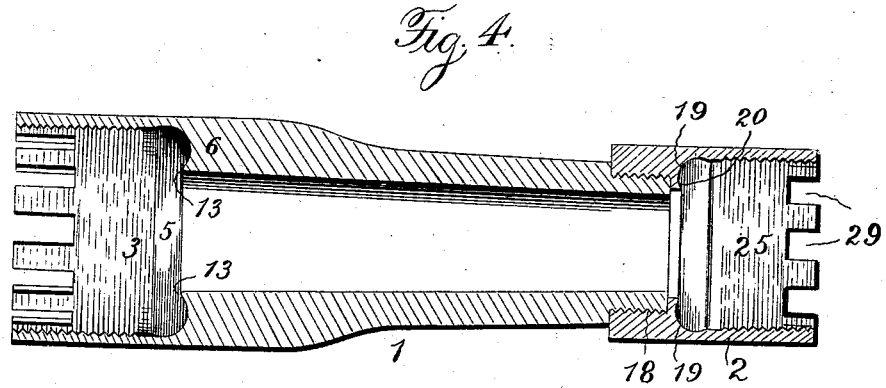
Figure 5:
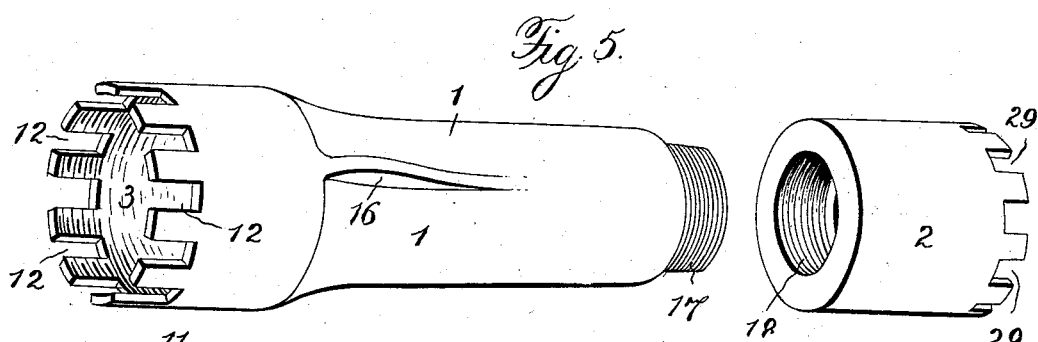
Figures 6, 7:
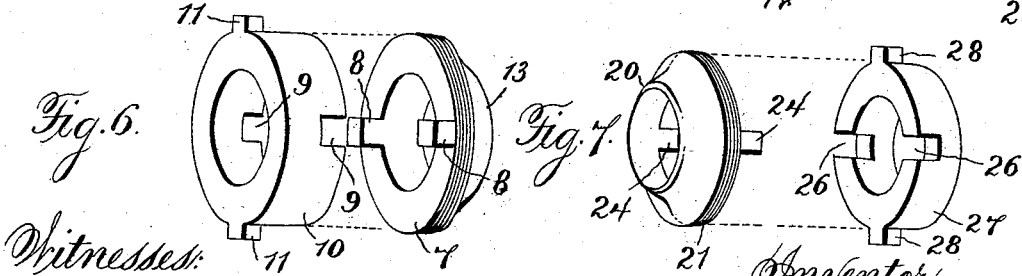

In the annexed drawings illustrating the invention,—Figure 1, is a side elevation of one end portion of an axle with boxing thereon. Fig. 2, is a longitudinal section of the boxing and nut, with the axle spindle in elevation. Fig. 3, is a longitudinal section of the ball bearing box detached from the wheel hub and axle spindle. Fig. 4, is a longitudinal section of the two-part boxing or sleeve with the balls and their retaining rings and caps removed. Fig. 5, shows in perspective the two parts of the box or sleeve detached from each other. Fig. 6, is a perspective of the ball retaining ring and its cap to be inserted into the larger or inner end of the boxing. Fig. 7, is a perspective of the ball retaining ring and its cap to be inserted into the smaller or outer end of the boxing.

Referring to the drawings, the numeral 1 designates the larger or inner end portion of the hub box or axle sleeve and 2 the outer end portion or detachable section of said box or sleeve. One end of the main box section 1 is enlarged circumferentially to form a chamber 3 for receiving the innermost annular series of anti-friction balls 4 and their retaining devices. The annular pocket or recess 5 for retaining this set of balls 4 is formed partly in an annular shoulder 6 provided within the enlarged portion of the main section 1; the other portion of said annular ball retaining recess being formed in one side of an externally threaded retaining ring 7 that is screwed into the chamber 3 of the main section 1 of the boxing. On its outer side the retaining ring 7 is provided with oppositely arranged lugs 8 for engagement of a wrench by which the said ring may be screwed into place. These lugs 8 also serve to engage in recesses 9 formed in one side of an annular cap 10 that is inserted in the enlarged end portion of the main box section 1 after the ring 7 has been placed in position to retain the previously inserted balls.

The periphery of the annular cap 10 is provided with radially arranged lugs 11 that are adapted to enter open ended slots 12 formed in the enlarged end of the main box section. A series of these slots 12 is provided so that the lugs 11 may be engaged with the box section 1 at any point that may be required by the engagement of the lugs 8 and recesses 9 as determined by the extent of rotation given to the ring 7 on screwing it into place. The balls 4 may be readily inserted into one side of the annular recess 5, and against the shoulder 6, while the boxing is held in a vertical position with the enlarged end uppermost, the ring 7 and cap 10 having been previously withdrawn. After the balls are placed, the retaining ring 7 will be screwed in and the annular cap 10 will then be inserted and engaged with said ring and with the enlarged and slotted end of the boxing. It will be seen that by the engagement of the lugs 8 in the recesses 9 and the engagement of the lugs 11 in the slots 12 the ring 7 and cap 10 are so connected to each other and with the box section 1 that they cannot turn independent of the boxing but will rotate therewith on the axle spindle.

Each half of the annular ball retaining pocket or recess 5 formed, respectively, in the shoulder 6 and ring 7 may be hemispherical in cross section or is so constructed, by means of concaved flanges 13 on said shoulder and ring, as to present an annular contracted opening next to the spindle 14 of the axle 15; so that while the balls will be permitted to project sufficiently to roll upon and in contact with the axle spindle they cannot become displaced or fall out, even when the vehicle wheel is removed from the axle.

The interior of the box section 1 may have a taper to correspond, as shown, with the usual taper of the axle spindle 14; or the spindle and the interior of the boxing may have a cylindrical form, as may be preferred.

On the exterior of the main box section 1 are wedge shaped fins or ridges 16 that are disposed in a longitudinal direction and adapted to engage in the wheel hub and prevent the boxing from turning therein.

The smaller end of the main box section 1 is reduced in external diameter and is provided with a male screw thread 17 to engage female threads 18 in the detachable box section 2 which, when screwed into position, will draw the main box section 1 tightly and closely into the wheel hub and hold it firmly in place. This manner of connecting the box sections and employing the section 2 as a nut to draw the main section 1 securely into place will obviate difficulty from crookedness of the boxing that may in some constructions be liable to occur on account of driving the boxing into the hub, for should the bore of the hub deviate even a little from a straight line the box will not be true and will be likely to cause friction on the axle, which will soon destroy both the axle and the box. In screwing the detachable box section 2 onto the main box section 1, the fins or ridges 16 on the said main box section will prevent its turning in the hub into which it will, therefore, be steadily drawn and firmly secured. This construction, also, leaves no place for lubricating oil or grease to leak into the hub. The sectional wheel box, made in proper sizes, will fit any wheel now in use, by slightly enlarging each end of the hub bore.

In the detachable and outermost box section 2 is a concavely recessed annular shoulder 19 having a flanged edge corresponding with a similar flange 20 on the concaved side of a ball retaining ring 21 which is adapted to form, with said concaved shoulder, an annular ball retaining recess 22 in which an annular series of anti-friction balls 23 will be placed. This annular ball retaining recess or pocket 22 is formed like the annular recess 5 of the main box section 1, so that when the ring 21 is in position the ball recess or pocket will present a contracted annular opening next to the axle spindle. The balls 23 will thus be permitted to project sufficiently to roll upon or in contact with the axle spindle and yet are so retained that they cannot fall out whether the wheel is upon or off from the axle. On the outer side of the screw-threaded ball retaining ring 21 are oppositely placed lugs 24 with which a wrench may be engaged to screw the ring into position; suitable screw threads being provided in the chambered portion 25 of the box section 2, as in the similar chamber 3 of the main box section. The lugs 24 serve also for engagement with recesses 26 in one side of an annular cap 27 the periphery of which is provided with radial lugs 28 to engage in open ended slots 29 formed in the end of the detachable box section 2; a series of said slots 29 being provided so that the lugs 28 can be engaged therewith at any required point as determined by the extent of rotation given to the ring 21 in screwing it into place. The engagement of the lugs 24 in the recesses 26 will hold the ring 21 and cap 27 together, while the engagement of the lugs 28 in the slots 29 of the box section 2 will prevent the said ring and cap from turning except with the boxing. A nut 30, on the outer screw threaded end of the axle spindle 14, will hold the wheel and boxing in position. The outer side of the annular cap 27 affords a smooth surface for contact with the face of the nut 30; and the outer side of the annular cap 10 is, also, made smooth for contact with the usual shoulder 31 at the inner end of the axle spindle.

It will be observed that this ball bearing requires no special construction of axle or wheel and can be readily attached to wheel hubs now in use without requiring any change in the axle spindle but only, in possibly some cases, a slight boring or reaming out enlargement of the bore at the hub ends. No oil holes are needed, as the lubricating is done in the old way, by taking the wheel partly off from the axle and pouring the oil onto the spindle, whence it will readily distribute itself to all points throughout the bearing.

The anti-friction balls are preferably made of steel; and the construction of the sectional boxing and its attached parts is such that those portions requiring it can be readily and economically chilled or hardened without incurring any great expense. Should the balls, by long and constant use, become so worn that they will be too small to bear properly upon the axle spindle they can be readily and quickly replaced by new ones; but even if not renewed immediately no difficulty or injury would result because, in that case, the bearings would be upon the entire boxing as in ordinary vehicle wheels. Should the boxing itself, either the main section 1 or the outermost section 2, become worn or disabled it can be easily detached and be replaced wholly or in part. Likewise, also, the ball retaining rings 7 and 21 and the caps 10 and 27 can be quickly taken out and be replaced by new ones whenever necessary.

In many ball bearings for vehicle wheels, the balls will fall out when the wheel is removed from the axle and great care and difficulty are often experienced in properly replacing them; while in the construction of boxing herein described the balls will be securely retained in the required position whether the wheel is on the axle or removed from it; and the construction and arrangement of parts are such that needed repairs or replacements can be quickly effected whenever necessary.

What I claim as my invention is—

1. In ball-bearing boxing for the hubs of vehicle wheels, the combination of the main box section having one end externally screw threaded and the other end screw threaded internally and provided with a series of longitudinal open ended slots, a detachable internally screw threaded box section adapted to engage at one end with the exterior screw threads of the main box section and provided at the other end with a series of longitudinal open ended slots, a ring screwed into each box section, respectively, and adapted to form with an interior shoulder thereof an annular ball retaining recess or pocket, and caps engaged with the respective outer sides of said ball retaining rings and with slots in the ends of the hub box section, substantially as described.

2. In ball-bearing boxing for the hubs of vehicle wheels, the combination of a main box section to be inserted into one end of the wheel hub and having on its exterior fins or projections to prevent it from turning therein, the smaller end of said box section being provided with exterior screw threads, a ring screwed into the larger end portion of the said main box section and adapted to form with an interior shoulder thereof an annular ball retaining recess or pocket, an annular cap engaged with said ring and with the end of the main box section, a detachable box section having interior screw threads to engage the exterior screw threads on the main box section, a ring screwed into said detachable section and adapted to form with an interior shoulder thereof an annular ball retaining recess or pocket, and an annular cap engaged with said ring and with the outer end of the detachable box section, the said ball retaining recesses in the two box sections being adapted to hold the anti-friction balls in position whether the wheel is on an axle or removed therefrom, substantially as described.

3. In ball-bearing boxing for the hubs of vehicle wheels, the combination of a main box section having an enlarged slotted end and a smaller externally screw threaded end, the said main box section being adapted for insertion into one end of a wheel hub and provided in the interior with an annular shoulder having a concavely flanged side, a detachable box section adapted to be inserted into the other end of the wheel hub and provided with interior screw threads to engage the externally screw threaded end of the main box section, the said detachable box section being also provided with a slotted end and with an interior annular shoulder having a concavely flanged side, ball retaining rings screwed into the said box sections and each having a concavely flanged side adapted to correspond with the similar flanged sides of the shoulders in the box sections and form annular ball retaining recesses or pockets therein, and annular caps engaged with rings and provided with radial lugs to engage the slotted ends of the box sections, substantially as described.

4. In ball-bearing boxing for the hubs of vehicle wheels, the combination of a main box section provided at one end with a series of open ended slots and with interior screw threads and an internal annular shoulder having a concavely flanged side, the other end of said box section being provided with exterior screw threads, a ring screwed into said main box section and provided on one side with lugs or projections and on the other side with a concaved flange to form an annular ball retaining pocket or recess with the concavely flanged side of the shoulder in said box section, an annular cap having in one side recesses to receive or engage the lugs of the said ball retaining ring and provided with radial lugs or projections to engage the slots in the end of the main box section, a detachable box section provided with interior screw threads and adapted to engage the exterior screw threads of the main box section, the said detachable box section being also provided at one end with a series of open ended slots and with an internal annular shoulder having a concavely flanged side, a ring screwed into said detachable box section and provided on one side with lugs or projections and on the other side with a concaved flange to form an annular ball retaining recess or pocket with the concavely flanged side of the shoulder in said box section, and an annular cap having in one side recesses to engage the lugs of said ball retaining ring and provided with radial lugs to engage the slots in the end of the detachable box section, substantially as described.

5. In ball-bearing boxing for the hubs of vehicle wheels, the combination of a main box section slotted at one end and adapted to be inserted into one end of a wheel hub and held from turning therein, a detachable box section adapted to be inserted into the other end of the wheel hub and having a screw threaded connection with the main box section, the outer end of said detachable box section being provided with a series of open ended slots and intervening projections, ball retaining rings screwed into said box sections and provided with lugs, the said lugs on the rings and the said projections on the detachable box section being adapted for the attachment of a wrench to screw and unscrew said parts, and annular caps inserted into the ends of the box sections and having recesses to receive the lugs of the ball retaining rings and provided with radial lugs or projections to engage the open ended slots of the box sections, substantially as described.

6. In ball-bearing boxing for the hubs of vehicle wheels, the combination of a main box section inserted into one end of the wheel hub and held from turning therein, a detachable box section inserted into the other end of the hub and having a screw threaded connection with the main box section, ball retaining rings screwed into said box sections and adapted to form annular ball retaining recesses or pockets therewith, annular caps engaged with said rings and box sections, annular series of anti-friction balls in the ball retaining pockets of the box sections, the said pockets being formed to hold the balls in position whether the wheel is on the axle or removed therefrom, and the axle spindle and its nut, substantially as described.

In testimony whereof I have hereunto set my hand in presence of two subscribing witnesses.

WILLIAM S. ROBINSON.

Witnesses:
D. P. COULTER,
V. E. STOKES.